(12) United States Patent
Brookman (10) Patent No.: US 11,041,631 B2
(45) Date of Patent: Jun. 22, 2021

(54) INSTALLATION OF COMBINED HEAT AND POWER SYSTEMS

(71) Applicant: Averill Partners, LLC, Branford, CT (US)

(72) Inventor: Michael Jeffrey Brookman, Branford, CT (US)

(73) Assignee: Averill Partners, LLC, Branford, CT (US)

(\*) Notice: Subject to any disclaimer, the term of this patent is extended or adjusted under 35 U.S.C. 154(b) by 162 days.

(21) Appl. No.: 16/350,781

(22) Filed: Jan. 15, 2019

(65) Prior Publication Data
US 2020/0224888 A1 Jul. 16, 2020

(51) Int. Cl.
| | |
|---|---|
| *F24D 3/08* | (2006.01) |
| *F24H 1/52* | (2006.01) |
| *F24H 9/20* | (2006.01) |
| *F02C 6/18* | (2006.01) |
| *F24H 1/00* | (2006.01) |

(52) U.S. Cl.
CPC .............. *F24D 3/08* (2013.01); *F02C 6/18* (2013.01); *F24H 1/0027* (2013.01); *F24H 1/52* (2013.01); *F24H 9/2007* (2013.01); *F24D 2200/04* (2013.01); *F24H 2240/00* (2013.01)

(58) Field of Classification Search
CPC .......... F23D 3/08; F02C 6/18; F24D 2200/04; F24D 2200/26; F24D 11/005; F24D 11/009; F24D 11/0228; F24D 11/0235; F24D 3/08; F24H 2240/00; F24H 2240/02; F24H 1/0027; F24H 1/52; F24H 1/0072; F24H 9/2007; H02K 7/18

USPC .............................. 237/12.1, 81; 60/320, 648
See application file for complete search history.

(56) References Cited

U.S. PATENT DOCUMENTS

| | | | | |
|---|---|---|---|---|
| 3,488,961 A | \* | 1/1970 | Gerber | F01K 17/02 60/652 |
| 3,944,837 A | | 3/1976 | Meyers et al. | |
| 4,752,697 A | \* | 6/1988 | Lyons | F01K 17/02 290/2 |
| 4,754,607 A | \* | 7/1988 | Mackay | F02C 6/18 237/12.1 |
| 4,857,755 A | \* | 8/1989 | Comstock | H02J 9/08 307/47 |
| 5,392,605 A | \* | 2/1995 | Kaplan | F01D 11/04 277/347 |
| 5,632,442 A | \* | 5/1997 | Misawa | F02D 29/04 165/240 |
| 5,799,867 A | \* | 9/1998 | Misawa | F25B 27/00 237/2 B |

(Continued)

FOREIGN PATENT DOCUMENTS

| | | | | | |
|---|---|---|---|---|---|
| DE | 2838389 A1 | \* | 3/1980 | ............. | F25B 30/02 |
| EP | 1628099 A2 | \* | 2/2006 | ............. | F25B 27/00 |

(Continued)

*Primary Examiner* — Daniel E. Namay
(74) *Attorney, Agent, or Firm* — Michael de Angeli (57) ABSTRACT

A combined heat and power (CHP) system is installed with a power lock-out feature preventing flow of heated working fluid to an expander driving a generator generating electrical power until installation by a licensed person is completed, whereby heat can be provided to a building substantially immediately after installation of the CHP system, while power generation can be deferred until convenient.

15 Claims, 3 Drawing Sheets

(56) References Cited

U.S. PATENT DOCUMENTS

| | | | |
|---|---|---|---|
| 6,053,418 A * | 4/2000 | Guyer | F01K 17/02 237/12.1 |
| 6,948,319 B2 * | 9/2005 | Hayakawa | F01K 21/047 60/784 |
| 7,401,578 B2 * | 7/2008 | Otterstrom | F02G 5/04 123/3 |
| 7,822,325 B2 | 10/2010 | Murphy et al. | |
| 7,930,882 B2 * | 4/2011 | Yuri | F02G 5/00 60/320 |
| 8,175,964 B2 | 5/2012 | Arfin | |
| 8,249,902 B2 | 8/2012 | Arfin et al. | |
| 8,286,423 B2 * | 10/2012 | Yuri | F24D 11/005 60/320 |
| 9,551,760 B2 | 1/2017 | Willis | |
| 9,600,045 B2 | 3/2017 | Sanders | |
| 9,816,399 B2 | 11/2017 | Brookman | |
| 10,036,347 B1 * | 7/2018 | Sherry | F02G 5/04 |
| 2003/0051496 A1 | 3/2003 | Fukushima | F02C 6/18 62/238.3 |
| 2005/0098643 A1 * | 5/2005 | Guyer | F24D 5/02 237/12.1 |
| 2005/0161521 A1 * | 7/2005 | Guyer | F24D 12/02 237/12.1 |
| 2006/0037347 A1 * | 2/2006 | Kang | F25D 21/04 62/323.3 |
| 2007/0012058 A1 * | 1/2007 | Cho | F25B 27/00 62/238.7 |
| 2007/0012418 A1 * | 1/2007 | Cho | F25B 13/00 165/58 |
| 2008/0022707 A1 * | 1/2008 | Cho | F25B 27/02 62/238.1 |
| 2008/0022708 A1 * | 1/2008 | Cho | F25B 13/00 62/238.7 |
| 2008/0023961 A1 * | 1/2008 | Cho | F25B 27/02 290/2 |
| 2009/0107129 A1 * | 4/2009 | Yuri | F24D 11/009 60/320 |
| 2010/0154381 A1 * | 6/2010 | Rapp | F01K 25/106 60/39.181 |
| 2011/0030753 A1 * | 2/2011 | Weaver | F01K 3/16 136/201 |
| 2016/0146153 A1 | 5/2016 | Hesselink et al. | |

FOREIGN PATENT DOCUMENTS

| | | | | |
|---|---|---|---|---|
| EP | 1744109 A2 * | 1/2007 | | F25B 13/00 |
| EP | 1744110 A2 * | 1/2007 | | F25B 27/02 |

* cited by examiner

FIG. 1

INSTALLATION OF COMBINED HEAT AND POWER SYSTEMS

FIELD OF THE INVENTION

This invention relates to aspects of the installation of combined heat and power generating systems, typically in retrofitting single family home heating systems.

BACKGROUND OF THE INVENTION

Brookman U.S. Pat. No. 9,816,399 ("the '399 patent") describes a combined heat and power (CHP) system that is particularly useful in heating systems in single family homes. The CHP system comprises a fuel-burning boiler or "forced hot air" furnace, hereafter referred to collectively as "boilers", typically a gas-burning boiler. The boiler provides heat, e.g. in the form of heated water for domestic uses, including hot water for washing and the like, and for space heating. The boiler also produces electric power, in that the steam exhausted from the boiler can be used to drive a turbine in turn driving a generator. The steam exhausted from the turbine can provide further water heating. Electric power from the turbine and generator can be used in lieu of electric power from the utility grid; any excess over immediate needs can be stored in a battery, or can be sold back to the utility.

The CHP system described in the '399 patent is useful in many circumstances. In the single family home application of primary interest, such a system can be installed upon construction of a new home, or as a retrofit, e.g., upon replacement of the heating system. The present application relates to solutions to problems that would primarily arise in the retrofit situation.

The CHP system described in the '399 patent provides two or more benefits to the homeowner/ratepayer/customer. In most cases, the benefits provided include heat and power generation, as above. In some circumstances, the system can be supplemented to provide cooling or other benefits; see the '399 patent.

In the retrofit circumstance of particular interest to this application, the installation process treats the heat and power features separately. An HVAC contractor can remove the old boiler and install the replacement boiler provided as part of a CHP system. However, the employment of the turbine and generator to provide power, and especially installation of a "net-flow" electric meter allowing excess power effectively to be "sold back" to the electric utility company, requires competency not normally provided by an HVAC contractor. Instead, a certified electrician will need to be hired to complete the power-generation feature of the invention, and coordination with the utility company will be required for grid integration if such is to be provided.

More specifically, power integration with the utility company requires a new "net flow" power meter that allows measurement of two-way power flow with respect to the grid. That installation is required before any CHP electrical power can be provided. The utility has at least five concerns related to this new power feature: ratepayer safety, installer safety, power delivery to the home, power delivery from the home (both "passively", as excess power is generated in the home, and "actively", as part of utility "demand response" requirements, that is, so that the utility company can control the contribution of home-generated power to the grid) and ratepayer billing.

Perhaps the biggest risk between meter upgrade and grid integration is the possibility of an unqualified homeowner or HVAC technician deciding to finish the installation himself. In order to avoid this possibility, every CHP system intended for integration with the grid requires a two-step verification process, to verify proper installation and proper grid integration. More specifically, each CHP system must have a utility-coordinated registration. Typically, the authorized installer is provided with one of several possible ways to login to the utility database, and, when prompted, to enter a PIN or other verification tool to allow two-way power flow. The CHP system will typically be capable of having the power generation function remotely controlled by the utility, so that the utility can draw power from homes, or suspend power flow in case of repair or inspection by qualified electricians or powerline workers.

The fact that the heat and power connections are established separately allows a CHP system to be installed immediately after the failure of the old boiler or furnace, thus providing heat and hot water, while the implementation of the power integration feature can be deferred to another time, convenient to the homeowner, installer and utility. This aspect of the invention is available whether the CHP system is monolithic in its design (one unit housing both heat and power features) or if the boiler (or furnace) features are installed separately from the power generation and other features.

The prior art recognizes that net flow electric meters must be installed if CHP systems are to be employed to feed excess electrical power back to the utility grid. See, e.g., U.S. Pat. No. 3,944,837 to Meyers et al, at the Abstract. Meyers et al teach that an individual-home generating unit can be used to generate electricity for domestic use, while heat from a diesel engine driving the electrical generator can be used to heat the house. Meyers et al suggest that a conventional current-measuring meter used for billing purposes can be controlled to run in reverse when power is being supplied to the grid from the home generator, thus automatically compensating the homeowner by a reduced electric bill. Meyers et al do not however consider the question of separate installation of the heat-producing and electrical generation and metering components, as addressed by the present invention.

U.S. Pat. No. 9,600,045 to Cook teaches a solar enclosure that includes a mechanical lock on the enclosure and "isolation breakers" in the enclosure. The mechanical lock seems to be intended to prevent unauthorized persons from opening the door and the breakers to be intended for safety during repair. These two features are part of the enclosure and do not suggest any staged installation process or coordination with supplier or utility during installation.

Other patents generally pertinent to the present invention include Murphy et al U.S. Pat. No. 7,822,325, showing a programmable water heater; Arfin U.S. Pat. No. 8,175,964, showing methods for financing renewable energy systems, and discussing selling power back to the utility; Arfin et al U.S. Pat. No. 8,249,902, relating to sales of renewable energy systems; Willis U.S. Pat. No. 9,551,760, relating to application of reverse energy flow to a solar panel to measure its characteristics; Sanders U.S. Pat. No. 9,600,045, relating to solar energy systems, including means for selling generated power to the utility company (see cols. 39-40); and Hesselink et al published application 2016/0146153, referring to integration of thermoacoustic power devices into the electrical grid. See paras. [0145-0146].

Thus, none of the references discussed address the particular point of the present invention: how best to integrate a combined heat and power system with a typical home and also make connection to the utility to sell power thereto.

SUMMARY OF THE INVENTION

In order to allow the heating and power generating functions of a CHP system to be separately activated, so that a failed furnace or boiler can be immediately replaced while allowing the power-generating function to be activated later, and to assure the safe and effective installation of the CHP system and its integration with the power grid, the power-generating components of the CHP system will include a mechanical or electrical lock-out switch which prevents immediate operation of the system in a power generating mode. This is referred to hereinafter as a "power lock-out" feature. The product will be delivered in this power-locked mode, allowing a qualified HVAC installer to place and integrate the CHP system in the space intended fur, or In place of, a conventional boiler or furnace.

After connection of gas and water lines, and making thermostat and power connections, the CHP system is a fully functional HVAC product, connected to the household electrical supply for proper electronic control. However, activating the power generation capability requires a secondary installation by a qualified electrician.

The power generation feature can operate in one of two modes: either "grid-tied" or "behind the meter." "Behind the meter," or "off-grid mode," allows for the generation of grid-quality power without connection to the grid. Usually a battery or other storage feature is employed to buffer variable demand from steady-state rates of generation. Grid-tied mode refers to the circumstance in which electric power, generated in excess of the immediate household demand, can be exported to the grid. This surplus energy may result in a credit paid by the utility to the homeowner. Both modes require proper installation by a qualified electrician, and the power lock-out feature is included in the CHP system to assure that safe and proper installation of the power generation feature is accomplished.

BRIEF DESCRIPTION OF THE DRAWINGS

The invention will be better understood if reference is made to the accompanying drawings, in which.

DESCRIPTION OF THE PREFERRED EMBODIMENTS

A "combined heat and power" (CHP) system provides heating, ventilation and air conditioning (HVAC) features in addition to power generation from combustible fuel. The underlying technology in its various forms, employing various types of external combustion engines for transforming heat energy into mechanical power, and thus to electrical power, such as turbines, twin-scroll expanders, and reciprocating-piston engines, organic Rankine cycle, or Stirling engine technologies as power sources) is mature in the marketplace. The CHP system with which the present invention is used may be as described in Brookman U.S. Pat. No. 9,816,399 ("the '399 patent"), which system is scaled for the home or small business, but is not so limited.

As CHP systems move from large, custom installations into smaller, standard product configurations intended for consumer purchase, the challenges and risks of unsafe and ineffective installations become important factors to be considered. More particularly, improper installation may lead to injury or death at worst, or reduced efficiency and installation safety at the least.

Another important factor in proper installation recognizes that the HVAC benefit from CHP accrues to the resident/homeowner, but the power generation benefit can accrue to both the resident/homeowner and the local utility. Laws recently passed in various jurisdictions provide incentives or credits for power generated in the home and exported to the power grid. These "net-metering" laws require cooperation between the resident homeowner and the utility company prior to installation, e.g. installation of two-way power metering.

It is presumed that most resident homeowners do not proactively replace their home heating systems. They rely on the incumbent boiler/furnace system until it no longer operates. This event prompts a call to an HVAC supplier/installer to restore heat at the earliest opportunity. As smaller-scale CHP systems displace demand for heat-only boilers and furnaces, the timing of heat restoration may not coincide with the utility's readiness for interconnection, and this may pose a safety risk to the homeowner, the installer, or a utility technician. More specifically, if the homeowner attempts to install the power generation feature, and fails to observe proper standards, the dangers inherent in electrical generation may cause harm.

Further, the utility has an interest and obligation to assure proper installation prior to operation, so as to ensure that only "grid-quality" power is exported to the grid, and to ensure proper accounting of power flow to and from the building.

Utilities have a growing interest in harvesting power from a network of "granular" and "dispatchable" power sources in homes and small businesses (such as the foregoing example). Utilities refer to this approach as "Demand Response" or similar, and see micro-CHP (home-scaled) systems as a counterpoise to the unregulated generation from wind and solar assets. One key development making the demand response possible is the "internet of things" (IoT), providing remote control of such appliances as power generation systems, allowing the utility to selectively draw power capacity from homes to meet real-time power demand.

Upon failure of an existing heating system, the homeowner wants immediate restoration of heat, to make the house livable. Upon failure of a furnace or boiler, the homeowner may choose to invest in a CHP system, to profit from reduced electric bills. The utility agrees to credit the homeowner for any power exported, but primarily wants the ability to summon additional power delivery on demand. This "win-win" relationship depends on a safe and effective source of grid-quality power, that is, clean 110-120 VAC, 60 Hz power, in-phase with grid power.

A successful installation requires a coordinated (two-step) installation plan whereby an HVAC technician first makes plumbing connection of the CHP system to gas and water lines, as well as making electrical connection to house current and to a thermostat, restoring heating and/or cooling to allow for a safe and comfortable living space. The effectuation of the power generation feature, being less urgent, is deferred to a time agreeable to the power utility. This second step is initiated by a certified electrician prepared to complete the second step to safely link CHP power generation with the electrical grid, through an inverter, electrical panel and utility meter.

As described above, in order to allow the heating and power generating functions of a CHP system to be separately activated, so that a failed furnace can be immediately replaced while allowing the power-generating function to be activated later, and to assure the safe and effective installation of the CHP system and its integration with the power grid, the power-generating components of the CHP system will include a mechanical and/or electrical "power lock-out feature" which prevents immediate operation of the system in a power generating mode. The product implementing the CHP system will be delivered in the power-locked mode, allowing a qualified HVAC installer to place and integrate the CHP system in the space intended for, or in place of, a conventional boiler or furnace.

As noted, after connection of gas (or other fuel) and water lines, and making thermostat and power connections, the CHP system is a fully functional HVAC product. Activating the power generation capability requires a secondary installation by a qualified electrician.

The power generation feature can operate in one of two modes: either "grid-tied" or "off-grid." Off-grid mode allows for the generation of grid-quality power without connection to the grid. Usually a battery or other storage device, (along with appropriate rectifying and inverting equipment, to convert AC from the generator to DC for storage in the battery, and vice versa) is employed to buffer variable demand from steady-state rates of generation. Grid-tied mode refers to the circumstance in which excess electric power is provided back to the utility company. Both modes require power installation by a qualified electrician, and the power lock-out feature is included in the CHP system to assure that safe and proper installation of the power feature is accomplished.

If the CHP installation will be grid-tied, a qualified electrician may install one or more inverters, panels, wiring and other power components for connection to a utility-furnished "net-flow" power meter which supports two-way power flow. This power installation may be coincident with HVAC installation, or at a time later.

For grid-tied installations, when the electrician has completed the power installation per instructions, the electrician contacts the utility to remove the power lock-out, either remotely by IoT, e.g., employing an on-site code the utility will provide entered via a keypad on the CHP unit, or a mechanical means provided to the electrician as part of certification training. Removal of the power lock-out constitutes a "handshake" between the installed CHP and the local utility for safe, coordinated power generation.

As installers gain experience and become trusted partners for the utilities, the level of control by the utilities may become more relaxed, but removing the lock-out remains a key commissioning event, implementing the transition from to grid-supplied to locally generated power.

If the remote utility power lock-out is operated over the Internet, e.g., by communication between the CHP system controller and the utility, the additional benefit of better management of this granular power network is provided. For example, the utility can remotely lock-out any installation that has not been maintained properly, or can do so to prevent stray power from injuring service crews in the area.

In the case of off-grid installation of the CHP system, it likewise remains in the best interest of the OEM producer of the CHP system, or their authorized network of resellers, to assure the product is properly and safely installed. The power lock-out feature provides assurance to the OEM that the product has been properly and safely installed either by a factory-authorized installer, or by a homeowner obtaining a pre-operational inspection by a factory-authorized service installer/inspector.

Figure 1:
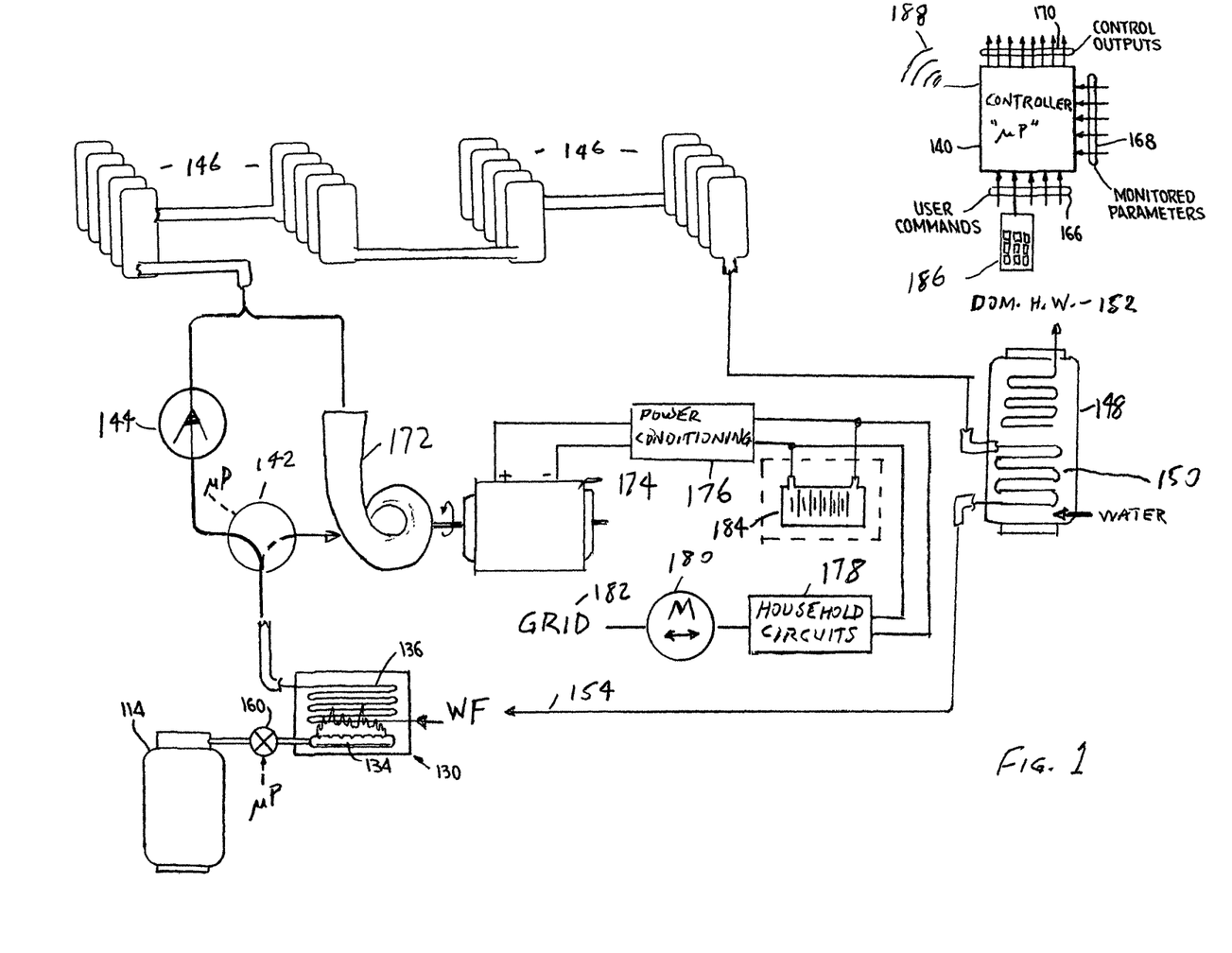
FIG. 1 shows a schematic diagram of a CHP system in connection with which the present invention is useful.

FIG. 1 shows a schematic diagram of one embodiment of a CHP system with which the method of the invention may find use. Fuel, e.g., from a tank 114 is supplied under control of a valve 160, along with ambient air, to a burner 134, which heats a working fluid WF in a coil of tubing 136 disposed in a heater 130. Valve 160 is controlled by a controller 140; the control connection is abbreviated "µP" in the drawing. If the working fluid undergoes a phase change, as when water is the working fluid and is heated to produce steam, as will be described herein for purpose of example, heater 130 may be termed a boiler. Suitable boilers, typically employed for hydronic heating systems, in which tubes under floors of living space have hot water pumped therethrough, are available from Camus Hydronics, of Mississauga, Ontario, Canada. However, it is to be understood that working fluids that do not undergo a phase change upon heating to useful temperature and pressure levels are within the scope of the invention, as will be discussed further below.

Steam produced in boiler 130 is supplied to a controllable two-way valve 142. Valve 142 is controlled by controller 140, again as indicated by "µP" in the drawing. When valve 142 is in the position shown, the steam passes through a check valve 144 (provided to prevent reverse flow when valve 142 is in the opposite position) and thence to domestic uses, such as space-heating radiators 146. The working fluid exits radiators 146 and then passes to a hot-water heater 148, where its remaining heat content is exchanged with water supplied at 150, and provided thence for domestic hot water uses at 152.

It will be appreciated that to this point the CHP system behaves just as a conventional domestic hot water system, that is, a working fluid is heated in a boiler, heats radiators to provide space heat, and heats water for domestic use. Further, it will be appreciated that if water is used as the working fluid, the hot water heater 148 can be eliminated in favor of direct supply from the radiator output to the domestic water system. Likewise, it will be appreciated that if a different working fluid is used, it can be recovered from the hot water heater 148 and returned to the input of the boiler, as illustrated at 154. Finally, it will be appreciated that a separate coil of tubing for heating water for domestic uses could be incorporated in boiler 130.

The components of the CHP system providing space heating and domestic hot water as described above can be installed by an HVAC technician and put into immediate operation, making the home livable. The components of the CHP system providing electrical power may literally be installed at the same time, e.g., as part of an integrated CHP system, but cannot be rendered operational until a certified electrician has completed the installation and connection of the remaining components necessary to connect the power-producing components of the CHP system to the grid; that is, the CHP system is provided in a power "lock-out" condition.

To this end, two-way valve 142 may be fitted with a keyed mechanical lock, or the controller 140 may be programmed to allow operation of valve 142 only after a "hand-shake" between the controller and the utility company has been completed, or otherwise.

After the "lock-out" feature has been disabled, that is, after the power-generation components have been successfully connected, all inspections required have been completed, and the like, valve 142 may be operated by controller 140 to direct heated working fluid from heater 130 to an expander 172. The expander 172 may be any of a variety of well-known devices for conversion of the kinetic energy of a heated working fluid to mechanical work, such as a turbine (as pictured), a twin-scroll expander, a reciprocating piston engine, or a Rankine- or Stirling-cycle engine. These various types of expanders are well-known in the art; that chosen for a given installation is a simple matter of design choice. Those of skill in the art will recognize that the choice of working fluid will vary in dependence on the type of expander chosen. A CHP system employing any of these expanders would require the same sort of lock-out feature upon installation and all are therefore within the scope of the invention. A suitable steam turbine 172 is the Green Turbine available from Green Turbine, Inc., of Toronto, Canada.

The expander 172 drives a generator 174 to produce electrical power. The power produced is supplied to suitable power conditioning circuitry 176, which ensures that power to be supplied to household circuitry 178 and to the electrical grid, as indicated at 182, is "clean", that is, is of the correct voltage, frequency and phase to be employed without difficulty. Such power conditioning circuitry, as well as a net-flow power meter 180, and other useful components, such as an optional battery 184 (with suitable rectifier and inverter components for AC to DC conversion, and vice versa) to buffer generator output with respect to instantaneous demand, are within the skill of the art.

As noted, fuel flow, operation of valve 142 and other aspects of the control of the CHP system, such as ignition of burner 134, are controlled by a controller 140, which may be implemented as a microprocessor (hence "μP") with appropriate ancillary devices or the like. More specifically, the control connections from the controller 140 to the various components controlled thereby, as indicated at 170, as well as inputs to the controller from various sensors monitoring process parameters throughout the system, indicated at 168, and control inputs to the controller, as indicated at 166, are not shown, to simplify the drawing. Implementation of these connections, and of the control of the various valves and the like comprised by the system by the controller responsive to control inputs are within the skill of the art.

In some embodiments, a keypad 186 may be provided in communication with the controller 140 to allow entry of control signals, such as codes to unlock the lock-out feature, as discussed further below, as well as setting the desired temperature of the space heated, and the like. In still further embodiments, the controller 140 may be provided with Internet communication ability, to enable communication with a utility's computers, for these and similar purposes, also discussed below, as indicated at 188.

As mentioned, according to the present invention valve 142 can be provided in a locked-out position, thus providing a mechanical power lock-out. That is, until the valve 142 is turned to allow flow of working fluid to the expander, which can be prevented by the CHP system's vendor until the proper installation has been verified, the expander is prevented from doing any work, and there is no possibility of an improper installation causing a dangerous situation to occur.

As discussed above, power from the combination of an expander 172 and a generator 174, is provided to the household circuits, as indicated at 178. In an "off-grid" installation a battery 184 may be employed to store excess power until needed. In a "grid-tied" embodiment, battery 184 will normally be omitted, and power in excess of that needed for household purposes will be sent to the utility grid indicated at 182 by way of a net-flow electric meter 180.

As discussed, an important aspect of the present invention is provision of a "lock-out" feature, whereby power generation is prevented until the installation has been completed by a licensed electrician, inspected as necessary, and properly verified, while use of the CHP system to supply heat is enabled immediately upon installation, so that the building can be heated as soon as possible. By comparison, a CHP system using an internal combustion engine as a source of mechanical power, e.g., to drive a generator, and as a source of heat, e.g., by way of heat exchange with the engine coolant and recovery of heat in the exhaust, would normally not be installed in a "heat-first, power-later" manner, since heat would ordinarily not be produced without generation of power. A qualified electrician would still be required to make the connections to the electrical grid, and the lock-out feature of the invention might nonetheless be used to ensure safe installation.

Figure 2:
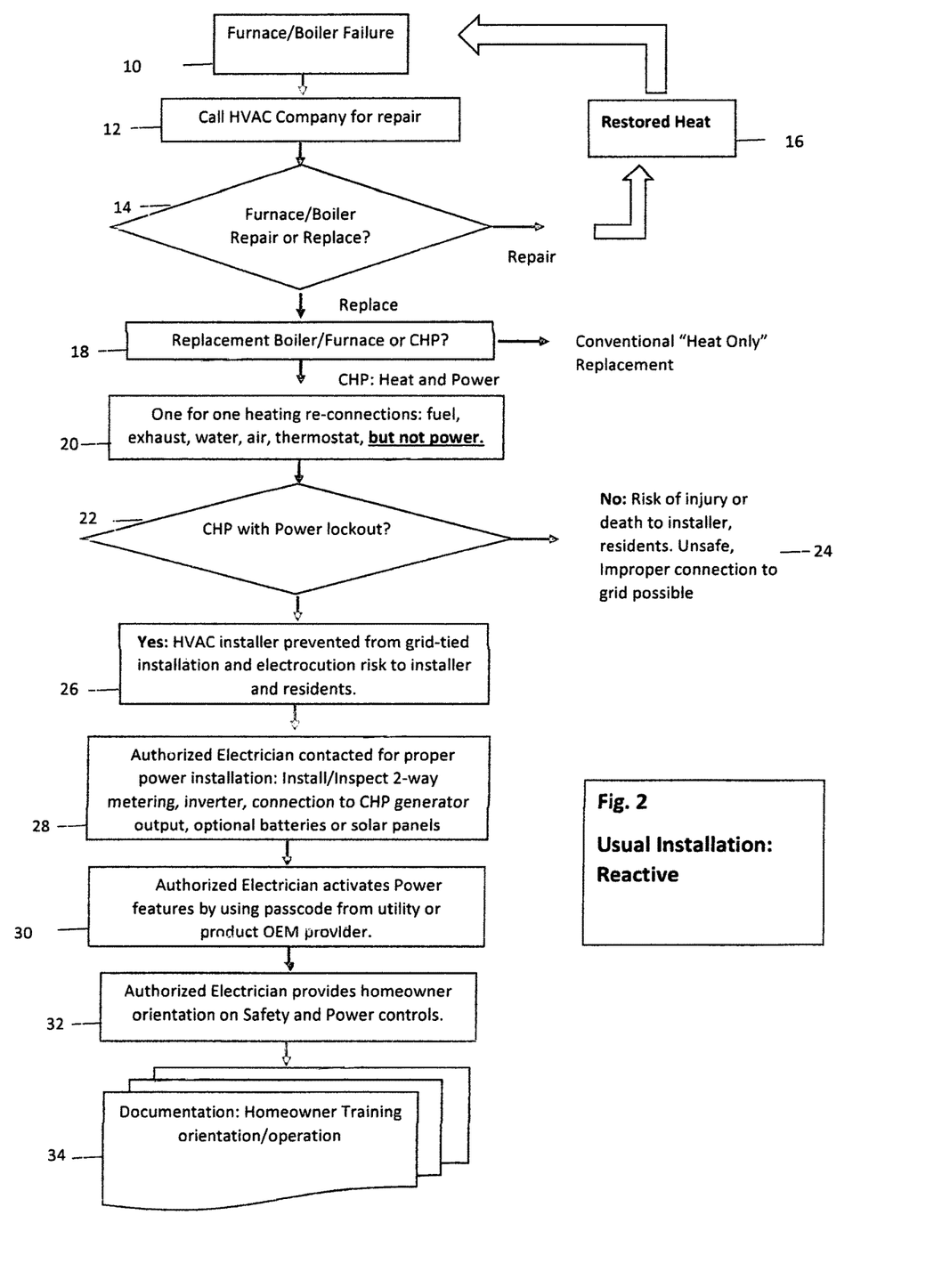
FIG. 2 shows a flowchart of the steps in a "reactive" installation of a CHP system, that is, in response to the existing heating system failure.
Figure 3:
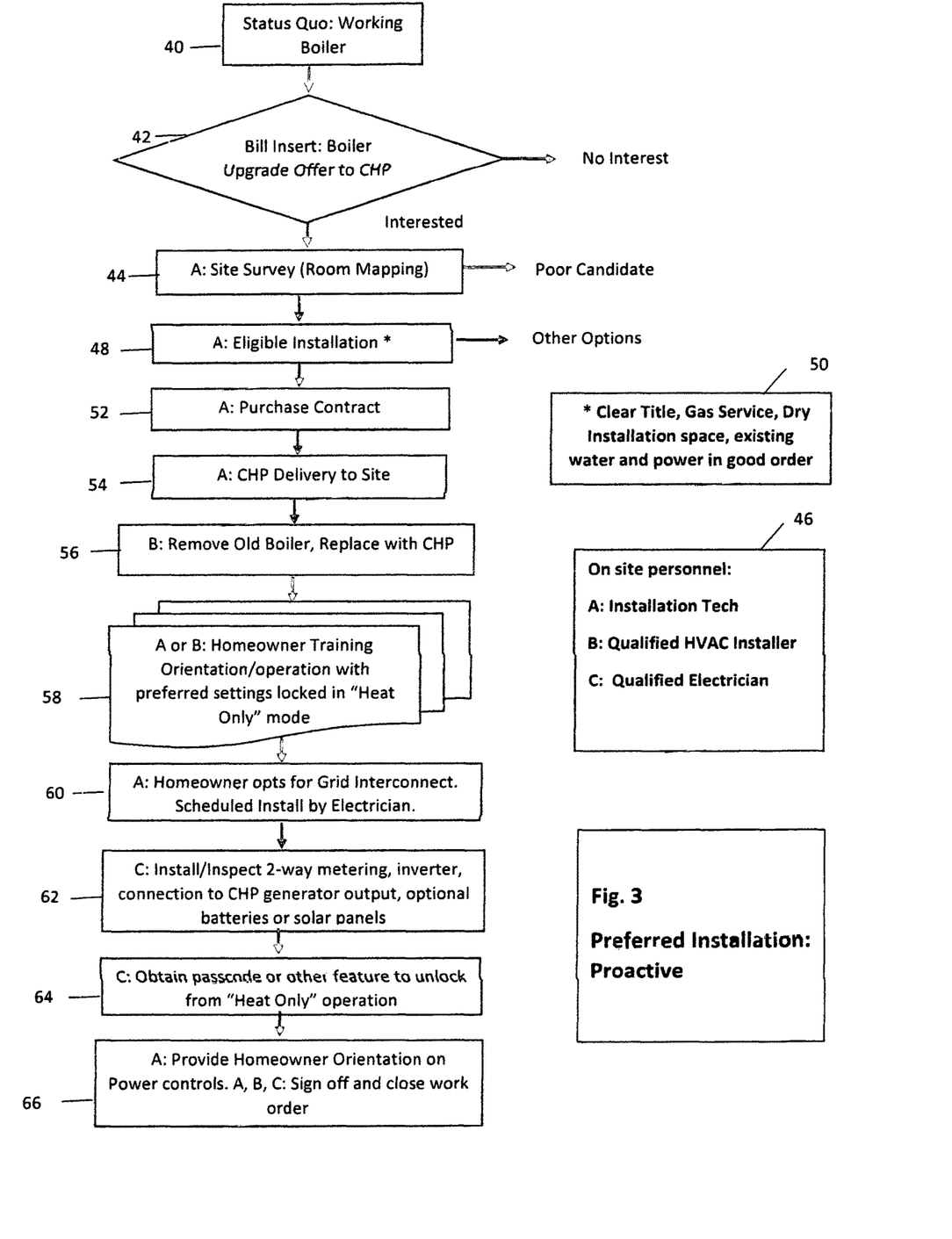
FIG. 3 shows a flowchart of the steps in a "proactive" installation of a CHP system, that is, replacement of an existing heating system with a CHP system.

FIGS. 2 and 3 show flowcharts of the steps in the process of installation of a CHP system, in "reactive" circumstances following the failure of a furnace or boiler, and "proactive" circumstances, that is, replacement of a functional furnace or boiler, respectively.

Thus, in FIG. 2, the first step 10 is failure of the furnace or boiler. The homeowner calls a repairman at 12. At step 14, the decision must be made whether to repair or replace the furnace or boiler. If it can be repaired, heat is restored at 16.

If the furnace or boiler cannot be repaired, the homeowner must decide at 18 whether to replace it with a similar unit or upgrade to a CHP system. If a CHP system is purchased, the heating components are connected at 20 as a direct replacement; the gas or oil supply pipe is connected, the water inlet piping is connected, the thermostat is connected, as is AC power for the fan and control circuitry. As noted, the power generation components are not connected at this point.

If the CHP system were not provided with power lock-out, as determined at step 22, the possibility of injury or death to an installer or residents would exist, together with the possibility of unsafe improper connection to the grid, as indicated at 24. If the CHP system does have a power lock-out, according to the invention, the HVAC installer is prevented from making grid-tied (or off-grid) power generation connections avoiding the risk of electrocution, as noted at 26.

The next step 28 in the installation process is to have an authorized electrician perform the power generation installation, including installation and inspection of a two-way net metering device, connection of power conditioning circuitry for ensuring the power delivered to the gird is of appropriate quality, connection of inverters and rectifiers if a battery is to be used for off-grid storage, connection of the generator output terminals, and connection of other power sources such as solar panels or wind generators if employed.

According to the invention, in step 30 the electrician activates the power generation features, effectuating the installation. This could take several forms, depending on the specifics of the lock-out feature. As discussed above, this could be mechanical, e.g., a valve that cannot be operated without special tools, electrical, such as a circuit component requiring activation over the Internet using a passcode provided by the utility or the CHP system supplier, or combinations thereof. Further possible ways of implementing this "lock-out feature" are discussed below.

At 32, the electrician provides the homeowner with orientation regarding the safe operation of the system, and at 34 provides appropriate documentation.

FIG. 3 shows schematically the steps in a typical CHP system installation in a proactive circumstance, that is, wherein a functioning boiler is replaced. FIG. 3 also indicates likely personnel assignment to perform these steps; in this example, person A is an installation technician, person B is an HVAC installer, and person C is a qualified electrician, as indicated at 46. Thus, at step 40 the status quo is that the boiler is functioning. Then, at 42, the homeowner is prompted to consider the installation of a CHP system, perhaps by a bill insert describing likely savings. If the homeowner is interested, the step 44 is for an installation technician to do a site survey, to ensure the site is appropriate. Next, at 48 the installation technician determines whether the building is eligible for CHP system installation; as indicated at 50, this involves determination that there are no clouds on the building title, that gas (or possibly oil) is available, that the installation space is dry and of adequate size, and that water and power connections are in good order.

If all is in order, the installation technician prepares a purchase contract at 52, and the CHP system components are delivered at 54. The HVAC installer then connects the CHP in place of the old boiler at 56. At 58 the homeowner is trained in the use of the CHP system to heat the house, with the system in "Heat Only", that is, power lock-out mode. As noted above, in this sequence heat is provided immediately, while the connection of the power-producing components can be delayed until a convenient time.

When that time is reached, at 60, the homeowner schedules the installation. The electrician then installs, at 62, the net-flow electric meter, inverter, power conditioning circuitry if required, and batteries and solar panels if used.

When these components have been installed correctly, the electrician then, at 64, obtains a passcode from the utility to unlock the lock-out feature, if it is thus enabled; otherwise, the electrician unlocks the lock-out feature according to its design. At this point the power generation features of the CHP system are fully enabled, and it remains only to provide the homeowner with orientation as necessary, at 66, and sign off on the installation.

As discussed above, an important aspect of the invention is the lock-out feature, whereby the power generation capability of the CHP system is disabled until the power connections are completed and inspected, if required by local municipal regulation. The lock-out feature can be implemented in a number of ways. One is simply to provide a mechanical valve, e.g., valve 142 in FIG. 1, that cannot be opened to allow flow of steam to expander 172 without a specialized tool provided to the electrician by the CHP system vendor. Alternatively, an electrical interlock may be provided. In this case, the controller 140 may be prevented from operation of valve 142 until successful installation; at that point the electrician may input a suitable code, provided by the utility or the CHP system vendor, to keypad 186 comprised by the CHP system so as to allow operation.

In the following, four distinct methods of providing and employing the lock-out feature are described in detail.

1. Provision of "Hand-Shaking" Between Power Generation Equipment and the Grid: IoT All systems for safe interaction between the CHP system requiring the sponsoring utility or provider to first provide and later disable the lock-out feature according to the invention in turn rely in some manner on the installer to assure proper installation and control. With the "Internet of Things" or IoT, a CHP system is provided with the capability to access the Internet and can thereby communicate directly with the utility or provider, provide assurances of safe and proper installation, and perform the hand-shake function that links a specific home CHP installation with the sponsoring utility and the grid as a whole.

After installing a CHP system in a home, the installer can use the keypad 186 provided as part of the CHP unit and connected to its controller and to the Internet to initiate contact with the utility and automatically share identifying information resulting in a "hand-shake" between the utility and the homeowner. Appropriate levels of cyber-security would assure reliability of the link.

The ratepayer would continue to operate and control the CHP operation by touchpad or remotely, and be informed of status and operational issues, but the utility/service provider will be automatically monitoring operation, and provide service and support based upon data provided by IoT, including management of surplus power via net-metering, as provided by a utility and ratepayer agreement.

For safety, and proper control, the power feature of the CHP remains locked off until proper handshake between ratepayer and utility is established and maintained by IoT.

2. Hard-Wired Methods of "Hand-Shaking" Power Generation Equipment to the Grid

For power utilities, the simplest technical way to provide the lock-out feature may be to simply provide a "hard-wired" connection from the power generator to the inverter, thence to the service panel, thence to the upgraded two-way meter, and finally to the nearest utility pole.

Power utilities employ "Utility Pole Identification Systems" to uniquely identify each pole location. When two-way metering is provided, a unique alpha-numeric identifier (e.g., Utility Pole Number: House Number) can be recorded by the utility or the designated installer. The on-site electrician would then obtain a verbal passcode from the sponsoring utility by phone or text message, or alternatively by entering an unlock code into the CHP controller, in order to provide safe and effective "handshake" through the signal wire to the pole.

3. Making a "hand-Shaking" Connection of Power Generation Equipment to the Grid: Wireless Modern cell phones provide the means of control for safe secure power connections between the CHP in the home and the utility or service provider. Security and control are provided by unique alpha-numeric codes, such as the International Mobile Station Equipment Identity (IMEI)—the unique identifier of a cell phone) that can be tied to a specific CHP installation for control on site, or remotely.

After installing a CHP system in a home, the installer can use the homeowner/ratepayer's cell phone to contact a utility-provided number, and either manually or automatically share identifying information effectively resulting in a "hand-shake" between provider and homeowner. Use of this handshake feature would be limited to authorized installers and agents for security and reliability of the link. The installer might then deactivate the lock-out feature by entering a code provided by the utility into a keypad comprised by the CHP unit.

If the controller is provided with cellular communication ability, the wireless feature allows the ratepayer to control CHP operation remotely and be informed of status and operational issues. Similarly, the utility/service provider may monitor operation, and provide service and support based upon shared data, including management of surplus power via net-metering, as provided by a utility and ratepayer agreement.

As above, for safety and proper control, the power feature of the CHP remains locked off until proper handshake between ratepayer and utility is established and maintained.

4. "Hand-Shaking" Connection of Power Generation Equipment to the Grid: Wifi

Most homes either have "WiFi" internet service in place, or could add WIFi as part of the CHP heat and power upgrade. Connection of electronic appliances to the WiFi router, and likewise connection of the WiFi router to the Internet service provider (ISP) requires a "hand-shake" of registration codes and passwords.

The newly installed CHP system can login to the home network (via the ISP) and then link to the utility or CHP provider by sharing login credentials. Once the utility or provider acknowledges the CHP registration, the utility or provider can provide a site-specific registration for the CHP to support off-site monitoring, maintenance required, and if supported by utility and ratepayer agreement, the management of surplus power via net-metering.

As above, for safety and proper control, the power-generation feature of the CHP remains locked off until proper handshake communication between the ratepayer and the utility is established and maintained.

While a preferred embodiment of the invention has been described in detail, the invention should not be thus limited, but only by the following claims.

What is claimed is:

1. A method for the safe installation of a combined heat and power (CHP) system, said CHP system comprising:
   a heater for burning fuel in order to heat a working fluid;
   an expander for accepting the heated working fluid from said heater, and for driving a generator producing electrical power responsive thereto; and
   a heat exchanger for accepting working fluid from said expander, and for heating water to produce domestic hot water;
   said method comprising the steps of:
   connecting inlets of said heater to a source of fuel, and to a supply of working fluid;
   connecting an outlet of said heater to said heat exchanger; and
   connecting an outlet of said heater to said expander;
   wherein a power lock-out feature is provided, preventing operation of said expander until installation of said expander and generator has been completed by trained and licensed personnel;
   wherein said power lock-out feature is operated to allow operation of said expander after installation thereof has been completed; and wherein said CHP system comprises an electronic controller directing flow of working fluid to said expander, and said lock-out feature is implemented such that a message must be passed from a local utility to the controller before working fluid can be so directed.

2. The method of claim 1, wherein said expander is selected from the group consisting of steam turbines, twin-scroll expanders, reciprocating-piston engines, and Rankine- and Stirling-cycle engines.

3. The method of claim 1, wherein said lock-out feature is implemented as a mechanical valve selectively directing flow of working fluid from said heater between said heat exchanger and said expander, wherein said valve can be operated to direct working fluid to said expander only after installation by licensed personnel.

4. The method of claim 1, wherein the controller is provided with Internet communication ability, and wherein said message is received over the Internet.

5. The method of claim 1, wherein the controller is hard-wired to the utility and said message is received thereby.

6. The method of claim 1, wherein the message is provided via cellular phone communication.

7. The method of claim 1, wherein the message comprises an activation code that is inputted to the CHP unit by the installer.

8. The method of claim 1, wherein the message is provided via WiFi connection.

9. The method of claim 1 wherein the working fluid is water, heated to make steam, and said expander is a turbine.

10. A method for safe installation of a combined heat and power (CHP) system, said CHP system comprising:
    a source of mechanical power and of heated fluid and/or gas;
    a generator being driven by said source of mechanical power, and for generating electricity responsive thereto; and
    a heat exchanger connected to said source of heated fluid and/or gas, for heating water for domestic use;
    wherein said generator is supplied with a lock-out feature, preventing operation of said generator until connection thereof to household circuits and, if desired, the electrical grid, has been completed by qualified personnel, and wherein said method comprises the step of disabling said lock-out feature upon completion of said connection; and wherein said CHP system comprises an electronic controller controlling operation of said generator, and said lock-out feature is implemented such that a message must be passed from a local utility to the controller before said generator can be operated.

11. The method of claim 10, wherein the controller is provided with Internet communication ability, and wherein said message is received over the Internet.

12. The method of claim 10, wherein the controller is hard-wired to the utility and said message is received thereby.

13. The method of claim 10, wherein the message is provided via cellular phone communication.

14. The method of claim 10, wherein the message comprises an activation code that is inputted to the CHP unit by the installer.

15. The method of claim 10, wherein the message is provided via WiFi connection.

* * * * *